United States Patent
Li et al.

(10) Patent No.: US 9,509,174 B2
(45) Date of Patent: Nov. 29, 2016

(54) DEVICE FOR IMPROVING ENDURANCE OF TERMINAL AND TERMINAL THEREOF

(71) Applicant: ZTE CORPORATION, Shenzhen, Guangdong Province (CN)

(72) Inventors: Xinyu Li, Shenzhen (CN); Yibo Li, Shenzhen (CN)

(73) Assignee: ZTE Corporation, Shenzhen, Guangdong Province (CN)

( * ) Notice: Subject to any disclaimer, the term of this patent is extended or adjusted under 35 U.S.C. 154(b) by 17 days.

(21) Appl. No.: 14/398,489

(22) PCT Filed: Jun. 28, 2013

(86) PCT No.: PCT/CN2013/078339
§ 371 (c)(1),
(2) Date: Nov. 3, 2014

(87) PCT Pub. No.: WO2013/178123
PCT Pub. Date: Dec. 5, 2013

(65) Prior Publication Data
US 2015/0155741 A1    Jun. 4, 2015

(30) Foreign Application Priority Data
Aug. 17, 2012 (CN) ...................... 2012 2 0412111 U

(51) Int. Cl.
| H02J 7/00 | (2006.01) |
| H02J 7/34 | (2006.01) |
| H02J 7/32 | (2006.01) |
| G06F 1/20 | (2006.01) |
| G06F 1/26 | (2006.01) |

(52) U.S. Cl.
CPC ................. *H02J 7/34* (2013.01); *G06F 1/206* (2013.01); *G06F 1/26* (2013.01); *H02J 7/007* (2013.01); *H02J 7/0068* (2013.01); *H02J 7/32* (2013.01); *H02J 7/0054* (2013.01); *H02J 7/345* (2013.01); *Y02B 40/90* (2013.01); *Y02B 60/1275* (2013.01)

(58) Field of Classification Search
CPC ............ H02J 7/35; H02J 7/355; H02J 7/345; H02J 7/0016; Y02E 60/12; Y02E 60/13; H01M 10/465; H01M 16/006; H02M 3/33507; H02M 3/07; H01G 9/155; Y02T 10/7022

USPC .......................................................... 320/101
See application file for complete search history.

(56) References Cited

U.S. PATENT DOCUMENTS

| 2003/0117112 A1* | 6/2003 | Chen ..................... H02J 7/0073 320/137 |
| 2006/0290206 A1* | 12/2006 | Tabei ...................... H02J 7/345 307/66 |
| 2007/0096564 A1* | 5/2007 | Maeda ..................... H02J 7/34 307/87 |
| 2011/0241625 A1* | 10/2011 | LoCascio .............. H02J 7/0052 320/140 |
| 2013/0221745 A1* | 8/2013 | Vershinin ................ B60L 3/108 307/10.1 |

FOREIGN PATENT DOCUMENTS

| CN | 201138850 Y | 10/2008 |
| CN | 201260290 Y | 6/2009 |
| CN | 101604939 A | 12/2009 |
| CN | 202759400 U | 2/2013 |
| WO | 2012009983 A1 | 1/2012 |

OTHER PUBLICATIONS

XP055207467A; David Salerno; Ultralow Voltage Energy Harvester Uses Thermoelectric Generator for Battery-Free Wireless Sensors; Journal of Analog Innovation; Oct. 2010.

* cited by examiner

*Primary Examiner* — Arun Williams
(74) *Attorney, Agent, or Firm* — Ling Wu; Stephen Yang; Ling and Yang Intellectual Property

(57) ABSTRACT

An apparatus for improving endurance capability of a terminal and a terminal thereof are provided. The apparatus includes: a heat collection module (10), used for collecting heat produced by heating electronic components inside the terminal; a thermoelectric conversion module (20), used for converting the collected heat into electric energy and transporting the electric energy to a storage capacitor module (30); a storage capacitor module, used for storing the electric energy and outputting a stable output voltage value; a comparator module (60), used for generating and sending a charging enable signal to a power management module (50) when the output voltage value exceeds a preset reference voltage value; and a power management module, used for charging a terminal battery (40) according to the charging enable signal.

10 Claims, 2 Drawing Sheets

DEVICE FOR IMPROVING ENDURANCE OF TERMINAL AND TERMINAL THEREOF

TECHNICAL FIELD

The present document relates to the field of energy conversion technology, and more particularly, to an apparatus for improving endurance capability of a terminal and a terminal thereof, and it converts the thermal energy produced by the electrical components inside the terminal into electrical energy and effectively stores and provides the electrical energy to the terminal, which can improve the working performance of the electronic components within the terminal to some extent and meanwhile can further improve the endurance capability of the terminal.

BACKGROUND OF THE RELATED ART

With the increasing development of technology, now all kinds of portable devices keep emerging, meanwhile such a portable device is designed with a larger and larger screen, more and more peripheral devices, and more and more complicated functions, and these design elements to a certain extent can increase the user's entertainment, but meanwhile, it leads to an increase in power consumption of the terminal, and the endurance capability is greatly weakened and the effective using time of the battery is significantly shortened, therefore, in the process of using such portable devices, users often require to frequently charge the battery of the mobile terminal.

However, the battery charging is often restricted by the external environment, for example, the environment where the user is located sometimes has no external power supply, which brings a great inconvenience for the users to use and seriously affects the user's daily work and life.

SUMMARY OF THE INVENTION

The inventors of the present document can note that under normal circumstances, for a portable terminal, when adding the peripheral devices or improving the original components, for example, the display screen of its LCD (Liquid Crystal Display) changes from 4-inch to 10-inch, these peripherals will release more heat at work, which leads to heat increasing dramatically inside the writing terminal, so that the temperature rises, which is bound to affect the working performance of other electronic components inside the terminal, thereby affecting the overall performance, and therefore, the designers often need to set a good heat dissipation apparatus inside or outside the terminal in the design process, in order to maintain the best working environment of these electronic components, but this dissipated heat will be wasted rather than being fully utilized.

In view of this, the present document makes full use of the heat generated by various electronic components within the portable terminal during the working process, and proposes an apparatus for improving the endurance capability of a terminal and a terminal thereof, to collect the heat generated by various electronic components in the portable terminal, and via a thermoelectric conversion module, the heat is converted into electrical energy and stored in a storage capacitor, and after the charges in the storage capacitor accumulate to a certain stage, it automatically triggers a power management module to charge the terminal battery, so as to improve the working environment of the electronic components inside the writing terminal to a certain extent, and also to improve the endurance capability of the portable terminal.

An apparatus for improving the endurance capability of a terminal, comprises:

a heat collection module, configured to collect heat generated by heating electronic components within the terminal;

a thermoelectric conversion module, configured to convert the collected heat to electrical energy and transport it to a storage capacitor module;

a storage capacitor module, configured to store said electrical energy, and output a stable output voltage value;

a comparator module, configured to, when said output voltage value exceeds a preset reference voltage value, generate and send a charging enable signal to a power management module;

a power management module, configured to charge a terminal battery based on said charging enable signal.

Preferably, said heat collection module adopts material with high thermal conductivity to connect to heating electronic components within the terminal.

Preferably, said thermoelectric conversion module is a thermoelectric power generation component whose high temperature end is connected to the heat collection module and low temperature end is connected to cold metal material.

Preferably, said cold metal material is one or more of copper, aluminum, steel, antimony and silver.

Preferably, said storage capacitor module comprises a first unilateral diode, a current limiting resistor, a storage capacitor and a regulator that are successively connected in series, wherein an anode of said first unilateral diode is connected to the heat collection module; said comparator module comprises a first enable switch, a second enable switch, a comparator, a second unilateral diode, a booster, and a multiplex voltage selection switch, wherein a first input end of the first enable switch is connected to an output end of the regulator, and a second input end of the first enable switch is connected to an output end of the power management module, an output end of the first enable switch is connected to a negative input end of the comparator as well as a first input end of the second enable switch, a positive input end of the comparator is connected to a first output end of the multiplex voltage selection switch, and an output end of the comparator is connected to a second input end of the second enable switch as well as an input end of the multiplex voltage selection switch, and an output end of the second enable switch is connected to an anode of the second unilateral diode, and a cathode of the second unilateral diode is connected to an input end of the power management module, and a second output end of the multiplex voltage selection switch is connected to one end of the booster, and the other end of the booster is connected to an anode of the terminal battery, and a third output end of the multiplex voltage selection switch is connected to the anode of the terminal battery.

A terminal comprises an apparatus for improving the endurance capability of the terminal, said apparatus comprising:

a heat collection module, configured to collect heat generated by heating electronic components within the terminal;

a thermoelectric conversion module, configured to convert the collected heat into electrical energy and transport the electrical energy to a storage capacitor module;

a storage capacitor module, configured to store said electrical energy and output a stable output voltage value;

a comparator module, configured to, when said output voltage value exceeds a preset reference voltage value, generate and send a charging enable signal to a power management module;

a power management module, configured to charge a terminal battery based on said charging enable signal.

Preferably, said heat collection module uses material with high thermal conductivity to connect to the heating electronic components within the terminal.

Preferably, said thermoelectric conversion module is a thermoelectric power generation component whose high temperature end is connected to the heat collection module and whose low temperature end is connected to cold metal material.

Preferably, said cold metal material is one or more of copper, aluminum, steel, antimony and silver.

Preferably, said storage capacitor module comprises a first unilateral diode, a current limiting resistor, a storage capacitor and a regulator that are successively connected in series, wherein, an anode of said first unilateral diode is connected to the heat collection module; said comparator module comprises a first enable switch, a second enable switch, a comparator, a second unilateral diode, a booster and a multiplex voltage selection switch, wherein, a first input end of the first enable switch is connected to an output end of the regulator, a second input end of the first enable switch is connected to an output end of the power management module, an output end of the first enable switch is connected to a negative input end of the comparator as well as a first input end of the second enable switch, and an positive input end of the comparator is connected to a first output end of the multiplex voltage selection switch, and an output end of the comparator is connected to a second input end of the second enable switch as well as an input end of the multiplex voltage selection switch, an output end of the second enable switch is connected to an anode of the second unilateral diode, and a cathode of the second unilateral diode is connected to an input end of the power management module, a second output end of the multiplex voltage selection switch is connected to one end of the booster, and the other end of the booster is connected to an anode of the terminal battery, a third output end of the multiplex voltage selection switch is connected to the anode of the terminal battery.

The embodiment of the present document provides an apparatus for enhancing the endurance capability of a terminal and a terminal thereof, it converts the thermal energy generated by the heating electrical components within the terminal into electrical energy, and effectively stores and provides the electrical energy to the terminal to use, which to a certain extent can improve the working performance of the electronic components within the terminal, and also improve the endurance capability of the terminal.

PREFERRED EMBODIMENTS OF THE PRESENT DOCUMENT

Hereinafter, with reference to the accompanying drawings, the embodiments of the present document will be described in detail, in order to enable those skilled in the art to better understand and implement the present document but the cited examples are not used to limit the present document.

The basic idea of the embodiments of the present document is to transfer the heat of the heating components (electronic components) inside the terminal to the heat collection module through the thermal conductive material, and the thermoelectric conversion module uses a thermoelectric power generation component to convert the collected thermal energy into electrical energy and store the electrical energy in the storage capacitor module, and when the electrical energy stored in the storage capacitor module is reaching to a certain extent and greater than a preset reference threshold, the power management module is triggered to charge the terminal battery, so as to achieve the purpose of improving the endurance capability of the terminal. It effectively uses the thermal energy dissipated by the terminal in the working process, and in the case that the terminal is not perceptible by the user when it is working, it can achieve the automatic charging of the terminal battery, improve the endurance capability of the terminal, and greatly facilitate the terminal users.

Figure 1:
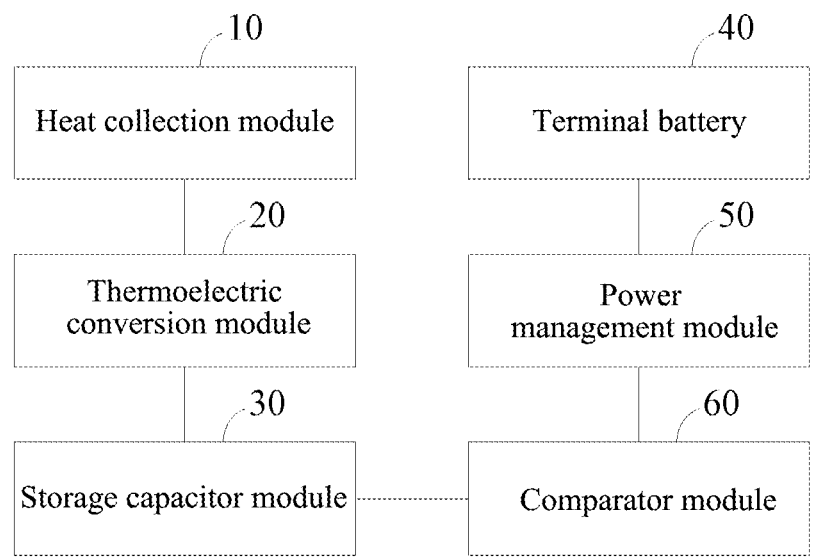
FIG. 1 is a structural schematic diagram of an apparatus for enhancing the endurance capability of a terminal provided in an embodiment of the utility model.

Based on an embodiment of the present document, as shown in FIG. 1, the embodiment of the present document provides an apparatus for improving the endurance capability of the terminal, comprising:

a heat collection module 10, configured to collect the heat generated by the heating electronic components within the terminal;

a thermoelectric conversion module 20, configured to convert the collected heat to electrical energy, and transport the electrical energy to the storage capacitor module;

a storage capacitor module 30, configured to store said electrical energy and output a stable output voltage value;

a comparator module 60, configured to: when said output voltage value exceeds a preset reference voltage value, generate and send a charging enable signal to the power management module;

a power management module 50, configured to: based on said charging enable signal, charge the terminal battery 40.

In a specific embodiment, said heating electronic components comprise all the components that can generate heat within the terminal, including the heating chips and other components that can generate heat. Usually, according to the characteristics of the components within the terminal, assessment test is performed on the main heating modules on the components, focusing on selecting a module that generates a large amount of heat as a primary heat collection source, such as CPU, RF chip, power management chip, LCD and so on. Meanwhile it can add thermal conductive materials at the back cover of the terminal or other areas that do not affect the working performance, so as to facilitate the utilization of an external heat source.

Preferably, said heat collection module 10 uses high thermal conductive material to connect to the heating electronic components within the terminal, and in the specific implementation, said thermoelectric conversion module 20 is a thermoelectric power generation component whose high temperature end is connected to the heat collection module 10 and whose low temperature end is connected to cool metal material, for example, in the preferred case, said cold metal material is one or more of copper, aluminum, steel, antimony and silver.

The heat collection module 10 uses the thermal conductive material to transfer the heat generated by the heat collection source to the front-end of the thermal energy conversion module for heat collection. When the heating components heat up, the high thermal conductive material quickly transfers the heat of the heating components to the heat collection area, so as to minimize the heat of the mobile phone and reduce the operating temperature of the heating components. High thermal conductive material can adopt high thermal conductive silica film or insulating material with relatively high thermal conductivity coefficients, the collected heat can be stored into the heat collection area that is composed of metals with good heat-absorbing capability. Usually, it can select one or more of copper, aluminum, steel, antimony, silver and other materials.

Figure 2:
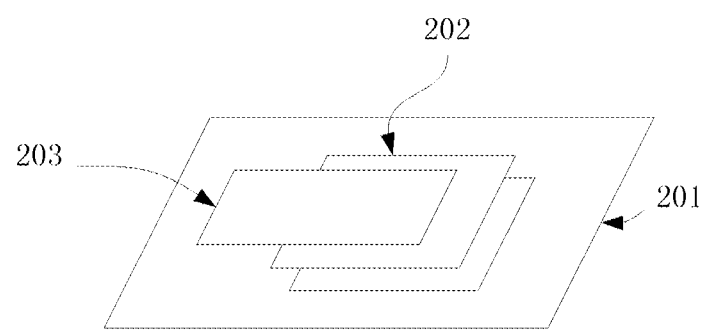
FIG. 2 is a schematic diagram of a heat-electricity conversion provided in an embodiment of the present document.

In this embodiment, the thermoelectric conversion module 20 uses a thermoelectric power generation component to convert the thermal energy collected in the heat collection area to electrical energy. The high temperature end of the thermoelectric power generation component is connected to the heat collection area, and the low temperature end of the thermoelectric power generation component is connected to the cold metal low temperature material, for example, said cold metal low temperature material can be material such as aluminum, copper or the like. The thermoelectric power generation component detects the temperature difference between high and low temperatures, internally generating the movement of electrons to form a current. The characteristics of the energy storage capacitor module 30 (such as a large capacitor) storing the charges is used to store the electrical energy converted from the thermoelectric power generation component into the capacitor to complete the accumulation of electrical energy.

as shown in FIG. 2, the heat collection area 201 is used for heat collection, using the high thermal conductive material to connect to the heating components and the heat collection area, and quickly transferring the heat of the heating components to the heat collection area. The high thermal conductive material can adopt good insulating material, such as high thermal conductive silica film. The metal material with good heat-absorbing capability can be selected for forming the heat collection area, and one of copper, aluminum, steel, antimony, silver and other materials is usually selected. The high temperature end of the thermoelectric power generation component 202 is connected to the heat collection area 201, and the low temperature end of the thermoelectric power generation component 202 is connected to the cold metal material 203. The cold metal material 203 can adopt the material with good heat dissipation, such as one of aluminum, copper or the like. The thermoelectric power generation component 202 generates electrical energy according to the temperature difference between the temperatures on both sides and outputs the electrical energy to the capacitor for storage. In the implementation process, it can take full advantage of the inner side of the back cover of the terminal to arrange the cold metal material 203 on the side of the back cover that is close to the back cover and arrange the heat collection area 201 on the top layer of the inner side of the back cover, and one end of the high thermal conductive material is tightly attached to the heating components, and the other end is tightly attached to the heat collection area 201 after the back cover is uncovered. The thermoelectric power generation component is arranged between the cold metal material 203 and the heat collection area 201, and the combination of the three parties is attached to inner side of the back cover of terminal, and the electrical energy output end of the thermoelectric power generation component is directly connected to the corresponding circuit.

The power management module 50 starts a charging algorithm according to the input condition of a large capacitor to charge the terminal battery 40. Since the power management module 50 itself has the charging parameters and charging algorithm of the terminal battery 40, it can improve the charging efficiency to some extent and prevent the terminal battery 40 from being damaged due to abnormalities such as over-voltage, which is the prior art and not repeated herein.

When the electrical energy accumulated in the storage capacitor module 30 that stores the electrical energy is greater than the comparison threshold or its output voltage value is greater than a preset reference voltage value (for example, said reference voltage value is the voltage of the terminal battery 40), the comparator module 60 automatically starts the power management module 50, so that the power management module 50 completes the operation of charging the terminal battery 40. Wherein, said terminal battery 40 comprises but not limited to nickel hydride, nickel cadmium or lithium ion power supply device and so on.

Figure 3:
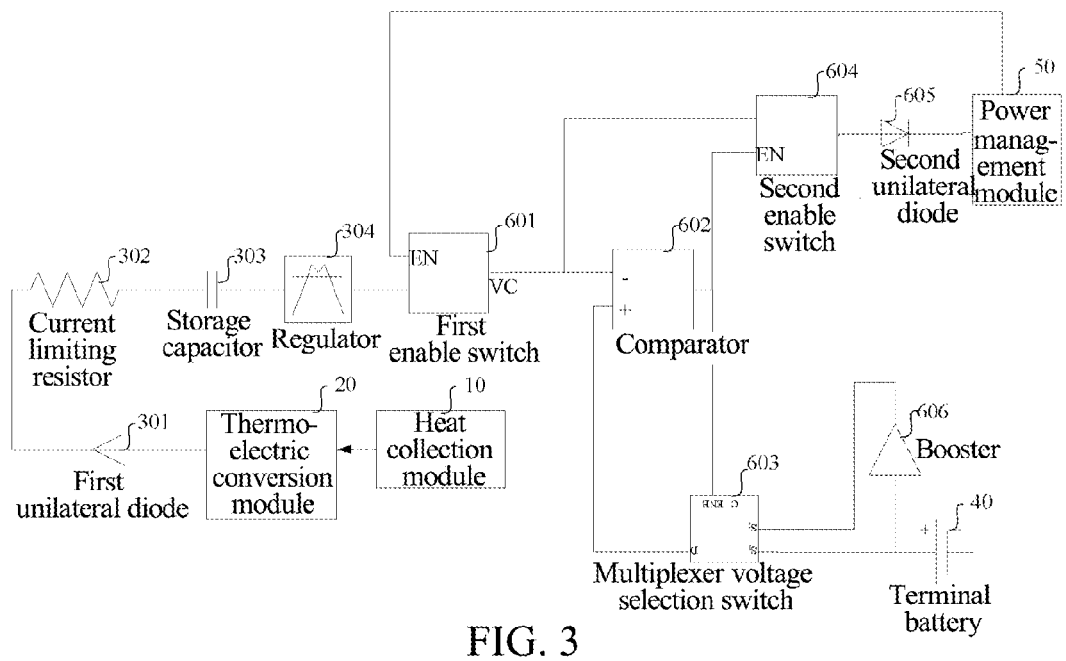
FIG. 3 is a schematic diagram of a circuit structure of a apparatus for enhancing the endurance capability of a terminal provided in an embodiment of the present document.

Preferably, referring to FIG. 3, said storage capacitor module 30 comprises a first unilateral diode 301, a current limiting resistor 302, a storage capacitor 303 and a regulator 304 that are connected in series, wherein, the anode of said first unilateral diode 301 is connected to the heat collection module 10; said comparator module 60 comprises a first enable switch 601, a second enable switch 604, a comparator 602, a second unilateral diode, a booster and a multiplex voltage selection switch, wherein the first input end of the first enable switch 601 is connected to the output end of the regulator 304, the second input end of the first enable switch 601 is connected to the output end of the power management module 50, and the output end of the first enable switch 601 is connected to the negative input end of the comparator 602 as well as the first input end of the second enable switch 604, the positive input end of the comparator 602 is connected to the first output end of the multiplex voltage selection switch, and the output end of the comparator 602 is connected to the second input end of the second enable switch 604 as well as the input end of the multiplex voltage selection switch, the output end of the second enable switch 604 is connected to the anode of the second unilateral diode, the cathode of the second unilateral diode is connected to the input end of the power management module 50, the second output end of the multiplex voltage selection switch is connected to one end of the booster, and the other end of the booster is connected to the anode of the terminal battery 40, and the third output end of the multiplex voltage selection switch is connected to the anode of the terminal battery 40.

Referring to FIG. 3, it is a schematic diagram of a circuit structure of an apparatus for improving the endurance capability of a terminal provided in accordance with an embodiment of the present document, and it describes the whole process of specifically implementing the scheme as well as the controlling process of storing the electrical energy into the terminal battery 40 in detail, and its specific implementation principles and steps are as follows:

step 1: the heat collection module collects the thermal energy generated within the terminal.

step 2: the thermoelectric conversion module 20 converts the thermal energy to a voltage and output the voltage.

Step 3: the output voltage goes through the first unilateral diode 301 and the current limiting resistor 302 to store the electrical energy in the storage capacitor 303 for electrical energy accumulation, and the first unilateral diode 301 has unilateral conductivity, which can prevent the backflow caused due to the voltage of the thermoelectric conversion module 20 being less than the voltage of the storage capacitor 303.

Step 4: The voltage of the storage capacitor 303 goes through the first enable switch 601 and perform the voltage comparison in the comparator 602, and the first enable switch 601 is in open state by default, and when the multiplex voltage selection switch is not activated, the voltage at the "+" end of the comparator 602 is a voltage of the terminal battery 40 which has gone through the booster, and according to the characteristic parameters of the common terminal battery 40, this voltage is configured to be 5V and denoted as VB. The voltage VC accumulated by the storage capacitor 303 is input to the "−" end of the comparator 602, and the reference voltage V5 is input to the "+" end of the comparator 602, and when VC<V5, the charges continues to accumulate on the storage capacitor 303, repeating steps 1, 2, 3 and 4.

Step 5: when VC>=V5, the comparator 602 opens the multiplex voltage selection switch, and then it switches the reference voltage at the "+" end of the comparator 602 to the actual voltage VB of the terminal battery 40, and there is a relatively large voltage difference between V5 and the actual voltage VB of the terminal battery 40, and the purpose is to allow the converted and output electrical energy to charge the terminal battery 40 for a long time. It prevents the charging efficiency from being affected or the electronic components within the terminal from being damaged due to the repeat switching when the VC and the voltage VB of the terminal battery 40 are comparable.

Step 6: When VC>=VB, the comparator 602 opens the second enable switch 604, at this time, the VC is directly input to the power management module 50, and the power management module 50 uses a specific charging solution for performing the charging management of the terminal battery 40.

Step 7: The power management module 50 continues to charge the terminal battery 40, and the voltage VB of the terminal battery 40 is gradually increasing, and when VB<=VC, proceeding to step 6, it continues to maintain the state of the power management module 50 charging the terminal battery 40, and the terminal battery 40 is always in the charging state.

Step 8: When the comparator 602 detects that VC<VB, at this time, the voltage of the storage capacitor 303 is not enough to charge the terminal battery 40, and the comparator 602 compares the voltages and automatically cuts off the multiplex voltage selection switch, and cuts off the second enable switch 604 at the same time, so as to prevent VC from entering into the power management module 50 to stop charging the terminal battery 40. Charges continue to be accumulated in the storage capacitor 303, proceeding to step 4, and the comparison voltage of the comparator 602 is also switched to the voltage V5 which has been processed by the booster.

Step 9: after the terminal battery 40 is charged full, the power management module 50 sends a signal as long as 10 S to the first enable switch 601, to let the first enable switch 601 cut off 10 S, a grounding signal is generated at the "−" end of the comparator 602 at this time, automatically cutting off the first enable switch 601 and the multiplex voltage selection switch after the comparison of voltage. The electrical energy continues to accumulate in the storage capacitor 303, and the whole process is repeated.

The above description completes the process of charging the terminal battery 40, and a lot of heat will be generated during the operation of the intelligent mobile terminal, when the voltage generated by the charges accumulated on the capacitor exceeds the reference voltage V5, the abovementioned charging process will occur, and the charges of the terminal battery 40 increase insensibly in the working process, or its charges decreasing rate is significantly reduced compared with its previous counterpart, and the endurance capability of the terminal is improved accordingly.

Continue to refer to FIG. 1, the embodiment of the present document further provides a terminal, and the terminal comprises an apparatus for improving the endurance capability of the terminal, and the apparatus comprises:

a heat collection module 10, configured to collect the heat generated by heating electronic components within the terminal;

a thermoelectric conversion module 20, configured to convert the collected heat to electrical energy and transport the electrical energy to a storage capacitor module 30; a energy storage capacitor module 30, configured to store said electrical energy, and output a stable output voltage value;

a comparator module 60, configured to: when said output voltage value exceeds a preset reference voltage value, generate and send a charging enable signal to a power management module 50;

a power management module 50, configured to: based on said charging enable signal, charge the terminal battery 40.

In the specific implementation, said heating electronic components comprise all the components that can generate heat within the terminal, including the heating chips and other components that can generate heat. Usually, according to the characteristics of the components within the terminal, assessment test is performed on the main heating modules on the components, focusing on selecting a module that generates a large amount of heat as a primary heat collection source, such as CPU, RF chip, power management chip, LCD and so on. Meanwhile it can add thermal conductive materials at the back cover of the terminal or other areas that do not affect the working performance, so as to facilitate the utilization of an external heat source.

Preferably, said heat collection module 10 adopts high thermal conductive material to connect to the heating electronic components within the terminal.

Preferably, said thermoelectric conversion module 20 is a thermoelectric power generation component, whose high temperature end is connected to the heat collection module 10 and whose low temperature end is connected to the cold metal material.

Preferably, said cold metal material is one or more of copper, aluminum, steel, antimony and silver.

Preferably, referring to FIG. 3, said storage capacitor module 30 comprises a first unilateral diode 301, a current limiting resistor 302, a storage capacitor 303 and a regulator 304 that are successively connected in series, wherein the anode of said first unilateral diode 301 is connected to the heat collection module 10; said comparator module 60 comprises a first enable switch 601, a second enable switch 604, a comparator 602, a second unilateral diode 605, a booster 606 and a multiplex voltage selection switch 603, wherein the first input end of the first enable switch 601 is connected to the output end of the regulator 304, and the second input end of the first enable switch 601 is connected to the output end of the power management module 50, and the output end of the first enable switch 601 is connected to the negative input end of the comparator 602 as well as the first input end of the second enable switch 604, the positive input end of the comparator 602 is connected to the first output end of the multiplex voltage selection switch 603, and the output end of the comparator 602 is connected to the second input end of the second enable switch 604 as well as the input end of the multiplex voltage selection switch 603, the output end of the second enable switch 604 is connected to the anode of the second unilateral diode 605, the cathode of the second unilateral diode 605 is connected to the input end of the power management module 50, the second output end of the multiplex voltage selection switch 603 is connected to one end of the booster 606, and the other end of the booster 606 is connected to the anode of the terminal battery 40, and the third output end of the multiplex voltage selection switch 603 is connected to the anode of the terminal battery 40.

Figure 4:
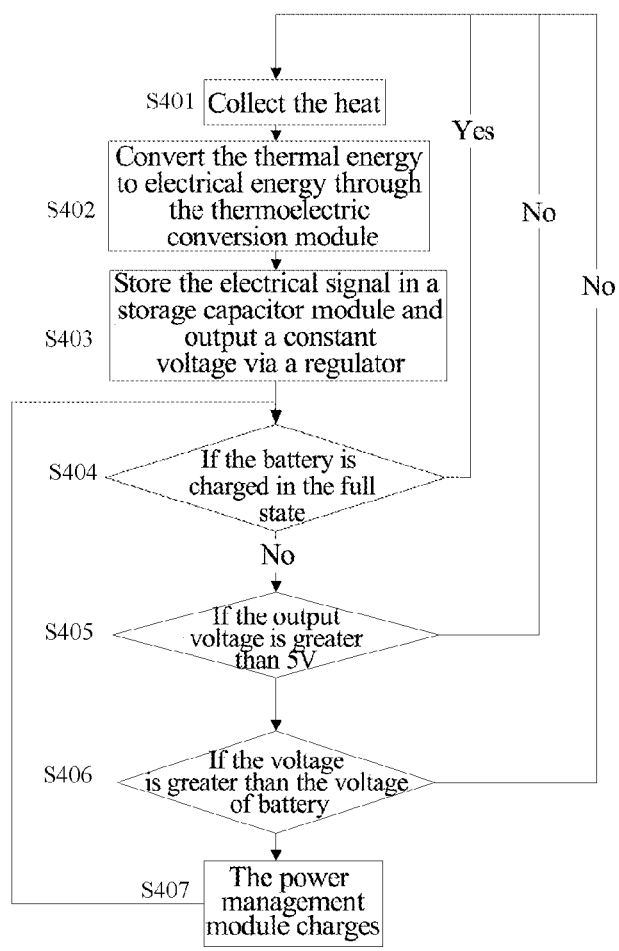
FIG. 4 is a schematic diagram of a thermoelectric conversion process provided in an embodiment of the present document.

Referring to FIG. 4, it illustrates a schematic diagram of a process of the terminal carrying out a thermoelectric conversion in accordance with an embodiment of the present document, and the implementation process of the terminal performing the thermoelectric conversion to improve the endurance capability of the terminal in accordance with the embodiment of the present document will be illustrated with FIG. 4.

Step S401: the heat collection module 10 collects heat.

Step S402: the thermal energy collected by the heat collection module 10 is converted to electrical energy through the thermoelectric conversion module 20.

Step S403: the electrical signal is stored in one storage capacitor module 30, outputting a constant voltage.

Step S404: it is judged whether the terminal battery 40 is in a fully charged state or not, and if the terminal battery 40 has already been charged fully, proceeding to step S401, and if the terminal battery 40 is not full, proceeding to step S405.

Step S405: whether the output voltage output by the storage capacitor module 30 is greater than 5V or not, if it is less than 5V, proceeding to S401, and if it is greater than 5V, proceeding to step S406.

Step S406: whether the output voltage output by the storage capacitor module 30 is greater than the voltage VB of the terminal battery 40 or not, if it is less than the voltage VB of the terminal battery 40, proceeding to step S401, and if it is greater than the voltage of the terminal battery 40, proceeding to step S407.

Step S407: the power management module 50 charges the terminal battery 40.

The terminal provided in the embodiment of the present document converts the thermal energy due to the heat generated by the electrical components within the terminal into electrical energy, and effectively store and provide it to the terminal, and it can improve the working performance of the electronic components within the terminal to a certain extent and also improve the endurance capability of the terminal.

The above description is only the preferred embodiments of the present document and is not used to limit the patent scope of the present document, and all equivalent structures or equivalent process transformations made with the specification and the accompanying drawings of the present document, or directly or indirectly used in other related fields of technology, should be included within the protection scope of the patent of the present document.

INDUSTRIAL APPLICABILITY

The embodiment of the present document provides an apparatus for enhancing the endurance capability of a terminal and a terminal thereof, and it converts the thermal energy generated by the heating electrical components within the terminal into electrical energy, and effectively stores and provides the electrical energy to the terminal to use, which to a certain extent can improve the working performance of the electronic components within the terminal, and also improve the endurance capability of the terminal.

What we claim is:

1. An apparatus for improving endurance capability of a terminal, comprising:
    a heat collection module collects heat generated by heating electronic components within the terminal;
    a thermoelectric conversion module converts the collected heat into electrical energy and transport the electrical energy to a storage capacitor module;
    the storage capacitor module stores said electrical energy, and output a stable output voltage value;
    a comparator module, when a terminal battery is not charged fully, and said output voltage value is greater than 5V and is greater than a voltage of the terminal battery, generates and send a charging enable signal to a power management module; and
    the power management module charges said terminal battery based on said charging enable signal.

2. The apparatus for improving endurance capability of a terminal of claim 1, wherein, said heat collection module adopts material with high thermal conductivity to connect to the heating electronic components within the terminal.

3. The apparatus for improving endurance capability of a terminal of claim 2, wherein, said thermoelectric conversion module is a thermoelectric power generation component whose high temperature end is connected to the heat collection module and low temperature end is connected to cold metal material.

4. The apparatus for improving endurance capability of a terminal of claim 3, wherein, said cold metal material is one or more of copper, aluminum, steel, antimony and silver.

5. The apparatus for improving endurance capability of a terminal of claim 1, wherein,
    said storage capacitor module comprises a first unilateral diode, a current limiting resistor, a storage capacitor and a regulator that are successively connected in series, wherein an anode of said first unilateral diode is connected to the heat collection module;
    said comparator module comprises a first enable switch, a second enable switch, a comparator, a second unilateral diode, a booster, and a multiplex voltage selection switch, wherein a first input end of the first enable switch is connected to an output end of the regulator, and a second input end of the first enable switch is connected to an output end of the power management module, an output end of the first enable switch is connected to a negative input end of the comparator as well as a first input end of the second enable switch, a positive input end of the comparator is connected to a first output end of the multiplex voltage selection switch, and an output end of the comparator is connected to a second input end of the second enable switch as well as an input end of the multiplex voltage selection switch, and an output end of the second enable switch is connected to an anode of the second unilateral diode, and a cathode of the second unilateral diode is connected to an input end of the power management module, and a second output end of the multiplex voltage selection switch is connected to one end of the booster, and the other end of the booster is connected to an anode of the terminal battery, and a third output end of the multiplex voltage selection switch is connected to the anode of the terminal battery.

6. A terminal, comprising an apparatus for improving endurance capability of the terminal, wherein, said apparatus comprises:
   a heat collection module collects heat generated by heating electronic components within the terminal;
   a thermoelectric conversion module converts the collected heat into electrical energy and transport the electrical energy to a storage capacitor module;
   the storage capacitor module stores said electrical energy and output a stable output voltage value;
   a comparator module, when a terminal battery is not charged fully, and said output voltage value is greater than 5V and is greater than a voltage of the terminal battery, generates and send a charging enable signal to a power management module; and
   the power management module charges a terminal battery based on said charging enable signal.

7. The terminal of claim 6, wherein, said heat collection module adopts material with high thermal conductivity to connect to the heating electronic components within the terminal.

8. The terminal of claim 7, wherein, said thermoelectric conversion module is a thermoelectric power generation component whose high temperature end is connected to said heat collection module and whose low temperature end is connected to cold metal material.

9. The terminal of claim 8, wherein, said cold metal material is one or more of copper, aluminum, steel, antimony and silver.

10. The terminal of claim 6, wherein, said storage capacitor module comprises a first unilateral diode, a current limiting resistor, a storage capacitor and a regulator that are successively connected in series, wherein, an anode of said first unilateral diode is connected to the heat collection module; said comparator module comprises a first enable switch, a second enable switch, a comparator, a second unilateral diode, a booster and a multiplex voltage selection switch, wherein, a first input end of the first enable switch is connected to an output end of the regulator, a second input end of the first enable switch is connected to an output end of the power management module, an output end of the first enable switch is connected to a negative input end of the comparator as well as a first input end of the second enable switch, and an positive input end of the comparator is connected to a first output end of the multiplex voltage selection switch, and an output end of the comparator is connected to a second input end of the second enable switch as well as an input end of the multiplex voltage selection switch, an output end of the second enable switch is connected to an anode of the second unilateral diode, and a cathode of the second unilateral diode is connected to an input end of the power management module, a second output end of the multiplex voltage selection switch is connected to one end of the booster, and the other end of the booster is connected to an anode of the terminal battery, a third output end of the multiplex voltage selection switch is connected to the anode of the terminal battery.

* * * * *